(12) United States Patent
Soininen et al.

(10) Patent No.: US 6,406,768 B2
(45) Date of Patent: Jun. 18, 2002

(54) SEMICONDUCTING FLOOR COVERING

(75) Inventors: Pertti Soininen, Nokia; Petri Peltonen, Tampere; Jarmo Mäkinen, Nokia, all of (FI)

(73) Assignee: Upofloor Oy, Nokia (FI)

( * ) Notice: Subject to any disclaimer, the term of this patent is extended or adjusted under 35 U.S.C. 154(b) by 0 days.

(21) Appl. No.: 09/171,314

(22) PCT Filed: Apr. 18, 1997

(86) PCT No.: PCT/FI97/00242

§ 371 (c)(1),
(2), (4) Date: May 13, 1999

(87) PCT Pub. No.: WO97/38856

PCT Pub. Date: Oct. 23, 1997

(30) Foreign Application Priority Data

Apr. 18, 1999 (FI) .................................................. 961699

(51) Int. Cl.$^7$ ........................... B32B 3/14; B32B 27/04; B32B 27/12

(52) U.S. Cl. ............................ 428/49; 428/46; 428/48; 428/518; 428/520; 442/110; 442/115; 442/179; 442/180

(58) Field of Search .......................... 442/16, 110, 115, 442/179, 180; 428/46, 48, 49, 518, 520, 931

(56) References Cited

U.S. PATENT DOCUMENTS

| 3,869,305 A | * | 3/1975 | Eiland .......................... 117/66 |
| 4,208,696 A |   | 6/1980 | Lindsay et al. |
| 5,073,425 A | * | 12/1991 | Dees, Jr. et al. .............. 428/48 |
| 5,258,232 A | * | 11/1993 | Summers et al. ........... 428/463 |
| 5,307,233 A |   | 4/1994 | Forry |

FOREIGN PATENT DOCUMENTS

| GB | 2144139 | 2/1985 |
| WO | 85/00723 | 2/1985 |

* cited by examiner

Primary Examiner—Terrel Morris
Assistant Examiner—Ula C. Ruddock
(74) Attorney, Agent, or Firm—Andrus, Sceales, Starke & Sawall, LLP

(57) ABSTRACT

A semiconducting floor covering which consists of a layer (2) of conductive material parallel to the surface of the covering and at least one layer (1, 3) of polyvinyl chloride based material adhered to the layer of conductive material. As plasticizer for the polyvinyl chloride in the floor covering, 2-ethyl hexyl diphenyl phosphate and aliphatic ester compound has been used or these two combined so that per 100 parts of polyvinyl chloride it contains 39–80 parts of plasticizer. It further contains 1–250 parts of talc and/or ATH as filler.

8 Claims, 1 Drawing Sheet

SEMICONDUCTING FLOOR COVERING

BACKGROUND OF THE INVENTION

The present invention relates to a semiconducting floor covering which consists of a layer of conductive material parallel to the surface of the covering and at least one layer of polyvinyl chloride based material which is adhered to the layer of conductive material and which contains polyvinyl chloride and at least one plasticizer.

Semiconducting floor coverings are required in places where electrostatic discharges or accumulations cannot be allowed on grounds of safety. This fact concerns e.g. the explosives and computer industries, and many other places where accumulations of static electricity and discharges thereof may cause problems concerning safety or cost.

A semiconducting floor covering is understood to be material in which resistivity measured from the surface of the covering material to the grounding point is at least 50 k$\Omega$ and no more than 100 M$\Omega$.

In prior art. a semiconducting floor covering is made of either rubber or plastic by adding thereto a sufficient amount of carbon black by means of which conductivity values assigned to a semiconducting covering material can be achieved. in another prior art solution the lower layer of a mat is of conductive material on top of which there is provided an isolating layer of material through which connections have been arranged made of conductive material so that the conductive material at these points extends from the surface of the coating material to the bottom. Such a solution is known e.g. from the U.S. Pat. No. 5,307,233 in which chips have been placed on a conductive bottom layer, the vertical edges of the chips having been coated by conductive material.

A problem with materials containing carbon black is that the material normally turns out black, and it cannot be covered with any colouring material. Further, the use of carbon black makes the machinery dirty during the manufacturing and causes output being wasted e.g. when changing the type of material. In addition, stretching such material in melted conditions deteriorates its conductivity. The solutions involving conductive elements of various kinds share the drawback that assembling a mat material from such elements is difficult and expensive, and furthermore, coating and measuring conductive elements for proper operation is difficult.

In addition, employing other conductive materials, such as metal particles, is expensive in such a covering, and further, the use of such additives causes significant restrictions to the colours or choosing of colours for the material because, due to the conducting properties, the coverings cannot be coloured and no surface pattern can be printed on them.

SUMMARY OF THE INVENTION

It is the object of the present invention to provide a semiconducting floor covering by means of which the prior art drawbacks may be avoided and by means of which floor coverings may be produced that work well and are wear-resistant, and which may be coloured and patterned by printing technique, and which may additionally have a colourless or transparent wear-resistant surface layer.

The floor covering according to the invention is characterized in that the plasticizer comprises 2-ethyl hexyl diphenyl phosphate and/or an aliphatic ester compound, and that the polyvinyl chloride material contains, as filler, talc and/or aluminium trihydrate so that the relative proportions of the components in the polyvinyl chloride material per 100 parts of polyvinyl chloride are 30-80 parts of said plasticizer and 1-250 parts of said filler.

The essential idea of the invention is that the principal plasticizer used for the polyvinyl chloride material (from hereafter, PVC) is 2-ethyl hexyl diphenyl phosphate (from hereafter, DPOF) and/or an aliphatic ester compound. whereby it is additionally possible to employ one or more of the following plasticizers:

- monomeric or polymeric phthalates
- monomeric or polymeric adipates
- phosphate plasticizers
- benzoate plasticizers
- polyester plasticizers
- trimellitate plasticizers
- alkylsulphonic acid esters
- polyglycoates so that 30-80 parts of plasticizer in all have been used per 100 parts of PVC. This means that the proportion of DPOF and/or aliphatic ester compound is at least 30 parts per 100 parts of PVC, and the proportion of other plasticizer may vary. Furthermore, an essential feature of the invention is that, in addition to plasticizer. filler which contains talc or aluminum hydrate (from hereafter, ATH) has been added into the PVC material to such an extent that the proportion of pure talc or ATH per 100 parts of PVC is 1-250 parts. According to the preferred embodiment of the invention, it is possible to produce colourless or even transparent PVC whose conductivity continues to fulfill the requirements of a semiconducting material. Yet another essential idea of the invention is to have a conductive layer to which a PVC layer has been adhered so that the conductive layer is either the bottommost layer of the floor covering or advantageously close to its bottom surface.

The inventive floor covering provides the advantage that the actual floor covering may be produced by simply mixing the materials in question to each other in said proportion, after which it may be adhered to the conductive layer either to one or both sides thereof. By employing a suitable carbon-glass fiber layer, or a metal layer, the conductive layer may be arranged within the actual covering material as desired. It is further advantageous of the covering according to the invention provide that by forming e.g. two PVC layers, the lower of which being coloured, for example white, and a colourless or transparent top layer, it is possible to produce floor coverings of any desired colours, in which the top layer may further be provided with wear-resistant components without degrading its semiconducting properties.

BRIEF DESCRIPTION OF THE SEVERAL VIEWS OF THE DRAWINGS

In the following, the invention will be described in closer detail with reference to the accompanying drawings, in which

FIG. 1 is a schematic representation of a floor covering prepared according to the invention. The floor covering consists of PVC material 1 which is substantially homogenous. Within the PVC material there is provided a carbon-glass fiber layer 2, which in this embodiment is the conductive layer. The PVC material 1 consists of PVC, plasticizer and filler as follows:

EXAMPLE 1

A 2 mm thick semiconducting material was prepared by mixing 100 parts of PVC, with 30 parts of aliphatic ester as plasticizer (trade name Bisoflex 124™, produced by International Specialty Chemicals). 5 parts of aluminum trihydrate, i.e. ATH, and 2 parts of titanium dioxide, and 2 parts of stabilizer. Within the layer, a carbon-glass fiber layer was provided, containing 10% of carbon. The resistivity of the material was measured across its thickness in accordance with the standard SFS-EN 100015 at 500VDC, and the resistivity obtained was $5 \times 10^5$ Ω.

This mixture provides a conductivity of $5 \times 10^5$ Ω for PVC material with the thickness of 0.1–2 mm. By varying the amounts of plasticizer and filler within the range 30–80 parts of plasticizer and 10–200 parts of filler, the resistivity varies to some degree but remains within the semiconducting range. The stabilizers are tin, calcium zinc or barium calcium zinc based compounds that are commonly used for stabilizing PVC based materials. These are known per se, and therefore there is no need to describe them any further.

The PVC material 1 may also be produced as follows:

EXAMPLE 2

A 1 mm thick semiconducting material was prepared with a carbon-glass fiber layer in the middle, the layer containing 10% of carbon as follows:

100 parts of PVC, 80 parts of plasticizer (consisting of 40 parts of DPOF, 30 parts of aliphatic ester and 10 parts of di-isodecyl adipate [DIDA]), 202 parts of filler (50 parts of talc and 150 parts of ATH, as well as 2 parts of titanium dioxide), and 2 parts of stabilizer were mixed. The resistivity of the material was measured across its thickness in accordance with the standard SFS-EN 100015, and the resistivity of $7 \times 10^5$ Ω was obtained.

Similarly in this manner, different values of resistivity may be obtained within the semiconducting range by varying the amounts of plasticizer and filler.

The carbon-glass fiber layer 2 contains 1–50% of carbon, whereby it forms a layer conductive enough and having adequate strength for use as a floor covering. Instead of the carbon-glass fiber layer, e.g. a thin wire mesh may be used which meets the required conductivity values.

Figure 1:
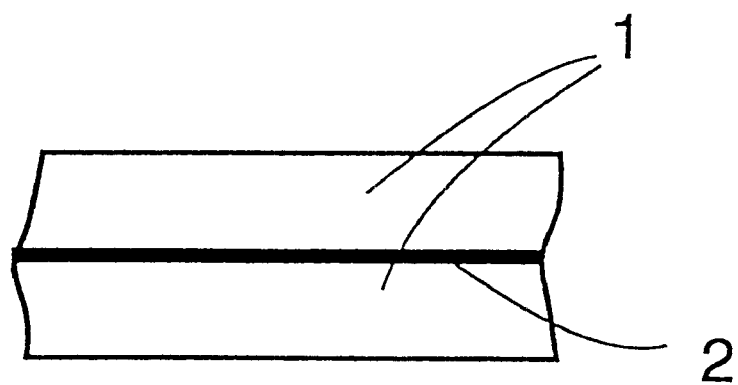
FIG. 1 shows an embodiment according to the invention.
Figure 2:
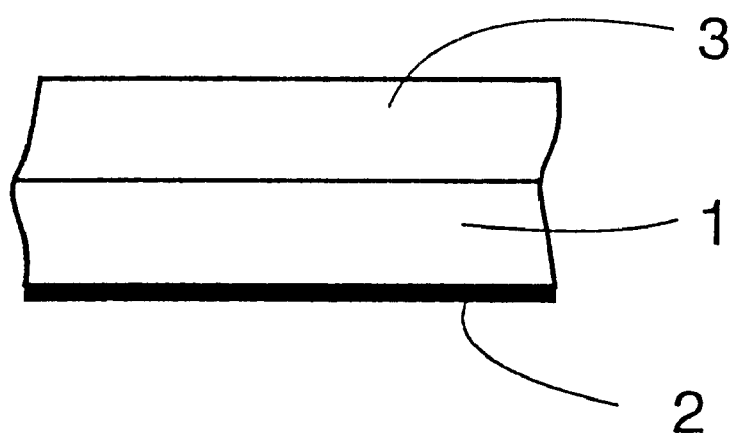
FIG. 2 shows a second embodiment of the floor covering according to the invention.

FIG. 2 shows a second embodiment for the floor covering according to the invention. In this embodiment, the conductive layer 2 is bottommost. on top of which there is a first PVC layer 1. On top of the first PVC layer 1 there is a second PVC layer 3, which deviates from the first PVC layer as to its composition and properties. in this embodiment, the second PVC layer 3 is formed as follows:

EXAMPLE 3

The material according to Example 1 (thickness 1 mm, without the carbon-glass fiber layer, layer 1 according to FIG. 2) was adhered to a 1 mm thick, colouriess layer prepared as follows (layer 3 according to FIG. 2):

100 parts of PVC, 60 parts of plasticizer (DPOF, trade name SANTICIZER 141), 10 parts of filler (talc) and 2 parts of stabilizer (trade name LANCRO BT 295). A conductive carbon-glass fiber layer was adhered to the bottom of the layer 1 in FIG. 2, the conductive layer containing 10% of carbon fiber, the resistivity of the material was measured across its thickness according to the standard SFS-EN 100015, and the resistivity of $17 \times 10^6$ Ω was obtained.

In this manner, a product has been obtained wherein the second PVC layer 3 is colourless whereas the first PVC layer 1 is in one way or another coloured. If desired, the first PVC layer may either be coloured plain or in a way known per se to comprise different patterns or colours without causing any substantial changes in its conductivity. Consequently, by incorporating into the second PVC layer 3 components that make it harder and wear-resistant, such as ATH or talc and if desired also 1-90 parts of glass in case the proportion of PVC is 100 parts, a colourless wear-resistant layer will be obtained through which the colours of the first PVC layer can be seen. The conductivity of the entire floor covering will nevertheless stay semiconducting through the layers 3 and 1 to the conductive layer 2, as desired. If it is desired that the second PVC layer is a transparent layer. the components required are mixed in the following proportion:

EXAMPLE 4

The material according to Example 2 (thickness 1.5 mm without the carbon-glass fiber layer, layer 1 according to FIG. 2) was adhered to a 0.5 mm thick transparent layer (layer 3 according to FIG. 2), prepared as follows:

100 parts of PVC, 55 parts of plasticizer (30 parts of DPOF and 25 parts of aliphatic ester), 20 parts of filler (ATH) and 2 parts of stabilizer. To the bottom of layer 1 illustrated by FIG. 2, a conductive carbon-glass fiber layer was adhered which contains 10% of carbon fiber, and the resistivity of the material was measured across its thickness according to the standard SFS-EN 100015, and the resistivity of $4 \times 10^6$ Ω was obtained.

Consequently, with use of suitable colours, it is possible to print a desired pattern on the first PVC surface and then to cover it with a second transparent PVC layer to obtain a semiconducting but, as to its appearance, a pleasant and appealing floor covering.

The conductive layer 2 may, as noted above, be formed of a carbon-glass fiber composition or by employing a wire mesh or the like. Further, the conductive layer may be obtained by printing, using conductive printing inks, a separate conductive layer either below the floor covering or, in case of a floor covering made of more than one PVC layers, between two layers. If desired, the conductive layer may also be made of normal mass that contains carbon black, although it has its well-known drawbacks. Furthermore, there may be provided a separate non-conductive layer of covering below the floor covering if it is desired to isolate the floor covering from its actual bedding. It is essential, however, that the PVC material extending from the surface of the floor covering to the conductive layer is prepared in the ways disclosed above, so that, as to its resistive properties, the entire floor covering is semiconducting.

Regarding the fillers, the talc may be pure talc or talcose material made from soap rock by grinding. However, when determining the parts of components in the covering material, they are determined according to the amount of pure filler i.e. pure talc, and the additives in the soap rock powder are not taken into account. The filler may be ATH or talc, and if desired they may both be used simultaneously. Furthermore, DPOF and/or an aliphatic ester compound (such as the product sold by the trade name Bisoflex 124™) may serve as the plasticizer, or these two together, or either one of them blended into one or more of the following plasticizers:

monomeric or polymeric phthalates
monomeric or polymeric adipates phosphate plasticizers
polyester plasticizers
trimellitate plasticizers
alkylsulphonic acid esters
glycoates
benzoates.

PVC material prepared according to the invention may, if desired, also be foamed, with the covering layer produced still fulfilling the requirements of semiconductivity. In addition, the conductive layer may be produced by a way known per se, in which the conductive layer is formed of material compounded from different kinds of conductive particles.

What is claimed is:

1. A semiconducting floor covering having a surface which is parallel to the floor when the covering is in use, said semiconducting floor covering comprising a layer (2) of conductive material parallel to the surface of the covering and at least one layer (1, 3) of polyvinyl chloride based material which is adhered to the layer of conductive material and which contains polyvinyl chloride and at least one plasticizer, the plasticizer comprising 2-ethyl hexyl diphenyl phosphate and the polyvinyl chloride based material further containing a filler comprised of talc and/or aluminium trihydrate so that the relative proportions of the components in the polyvinyl chloride based material per 100 parts of polyvinyl chloride are 30–80 parts of said plasticizer and 1–250 parts of said filler.

2. A floor covering as claimed in claim 1, wherein the conductive layer comprises a carbon-fiber layer.

3. A floor covering as claimed in claim 1, comprising at least one colorless layer of polyvinyl chloride based material, wherein the portions of the components of the colorless layer are per 100 parts of polyvinyl chloride, 35–70 parts of plasticizer, and filler in such an amount that the proportion of pure talc and/or aluminum trihdrate therein is 1–90 parts.

4. A floor covering as claimed in claim 3, comprising at least one transparent polyvinyl chloride layer wherein the proportions of the components of the polyvinyl chloride layer are 100 parts of polyvinyl chloride. 35–70 parts of plasticizer, and filler in such an amount that the proportion of pure talc and/or aluminium trihydrate therein is 1–90 parts.

5. A floor covering as claimed in claim 4 comprising at least two layers of polyvinyl chloride based material, wherein a lower layer adhered to the conductive layer is colored.

6. A floor covering as claimed in claim 5, further comprising a pattern printed on the surface of the colored layer prior to forming the transparent layer.

7. A floor covering as claimed in claim 3 comprising at least two layers of polyvinyl chloride based material, wherein a lower layer adhered to the conductive layer is coloured.

8. A floor covering as claimed in claim 7, further comprising a pattern printed on the surface of the colored layer prior to forming the colorless layer.

* * * * *